US 11,069,366 B2

(12) United States Patent
Yang et al.

(10) Patent No.: US 11,069,366 B2
(45) Date of Patent: Jul. 20, 2021

(54) METHOD AND DEVICE FOR EVALUATING PERFORMANCE OF SPEECH ENHANCEMENT ALGORITHM, AND COMPUTER-READABLE STORAGE MEDIUM

(71) Applicant: Beijing Xiaomi Mobile Software Co., Ltd., Beijing (CN)

(72) Inventors: Yuhong Yang, Beijing (CN); Linjun Cai, Beijing (CN); Fei Xiang, Beijing (CN); Shicong Li, Beijing (CN); Jiaqian Feng, Beijing (CN); Weiping Tu, Beijing (CN); Haojun Ai, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/930,938

(22) Filed: May 13, 2020

(65) Prior Publication Data

US 2021/0158832 A1 May 27, 2021

(30) Foreign Application Priority Data

Nov. 22, 2019 (CN) .......................... 201911157422.9

(51) Int. Cl.
*G10L 21/0308* (2013.01)
*G10L 25/27* (2013.01)
*G10L 15/14* (2006.01)

(52) U.S. Cl.
CPC .......... *G10L 21/0308* (2013.01); *G10L 15/14* (2013.01); *G10L 25/27* (2013.01)

(58) Field of Classification Search
USPC ........................................................ 704/237
See application file for complete search history.

(56) References Cited

U.S. PATENT DOCUMENTS

2017/0094420 A1* 3/2017 Boldt ...................... G10L 25/60
2017/0272870 A1* 9/2017 Andersen ............. H04R 25/552
2019/0132687 A1* 5/2019 Santos ................. G10L 21/0208

FOREIGN PATENT DOCUMENTS

EP         3147904 A1      3/2017

OTHER PUBLICATIONS

Cees H. Taal et al: "An Algorithm for Intelligibility Prediction of Time-Frequency Weighted Noisy Speech", IEEE Transactions on Audio, Speech and Language Processing, vol. 19, No. 7, Sep. 1, 2011, pp. 2125-2136.

(Continued)

*Primary Examiner* — Stella L. Woo
(74) *Attorney, Agent, or Firm* — Finnegan, Henderson, Farabow, Garrett & Dunner, L.L.P.

(57) ABSTRACT

A method for evaluating performance of a speech enhancement algorithm includes: acquiring a first speech signal including noise and a second speech signal including noise, wherein the first speech signal is acquired from a near-end audio acquisition device close to a sound source, the second speech signal is acquired from a far-end audio acquisition device far from the sound source, and the near-end audio acquisition device is closer to the sound source than the far-end audio acquisition device; acquiring a pseudo-pure speech signal based on the first speech signal and the second speech signal, as a reference speech signal; enhancing the second speech signal by using a preset speech enhancement algorithm, to obtain a denoised speech signal to be tested; and acquiring a correlation coefficient between the reference speech signal and the speech signal to be tested, for evaluating the speech enhancement algorithm.

20 Claims, 13 Drawing Sheets

(56) References Cited

OTHER PUBLICATIONS

Supplementary European Search Report in the European application No. 20177249.8, dated Oct. 28, 2020.

* cited by examiner

METHOD AND DEVICE FOR EVALUATING PERFORMANCE OF SPEECH ENHANCEMENT ALGORITHM, AND COMPUTER-READABLE STORAGE MEDIUM

CROSS-REFERENCE TO RELATED APPLICATION

This application is based upon and claims priority to Chinese Patent Application No. 201911157422.9, filed on Nov. 22, 2019, the entire content of which is incorporated herein by reference.

TECHNICAL FIELD

The present disclosure relates to the field of control technologies, and in particular to a method and device for evaluating performance of a speech enhancement algorithm, and a computer-readable storage medium.

BACKGROUND

Automatic speech recognition (ASR) is a crucial technique for realizing human-machine interaction, and the essential problem to be solved is how to enable a computer to recognize speech of a human and convert the speech into text. An important thing in improving a speech recognition rate is speech enhancement, that is, denoising the speech, for example improving the signal to noise ratio of the speech, so as to improve the quality of the speech and to reduce the error rate in recognition. It is generally necessary to utilize a speech quality evaluation algorithm to evaluate a performance parameter of a speech enhancement algorithm.

With a speech quality evaluation algorithm being a short-time objective intelligibility (STOI) measure as an example, a model for objectively evaluating speech quality complying with auditory perception of human beings is built by comparing a spectral relation between a pure speech and a denoised speech signal to be tested. The pure speech is a speech without distortion or noise pollution.

The existing STOI is designed for predicting intelligibility of a target signal by a listener based on human auditory perception, and is well correlated with subjective listening tests. Since differences may exist between the listener's subjective auditory feeling and machine recognition, a result predicted by the STOI is not highly related to a result recognized by a back-end machine. This is because properties of a speech enhancement algorithm are not considered in the existing STOI, that is to say, a completely pure speech reference signal cannot be obtained by the speech enhancement algorithm, so that there is still too much noise in the enhanced speech signal or the speech signal is weakened, after the speech enhancement. The subsequently obtained speech recognition model will have robustness to adapt to the properties. In other words, when the reference speech signal is a pure speech signal, there will be an error in the evaluation result of the speech enhancement algorithm, which is disadvantageous to the judgment of the performance of the speech enhancement algorithm.

SUMMARY

According to a first aspect of embodiments of the disclosure, a method for evaluating performance of a speech enhancement algorithm, includes: acquiring a first speech signal including noise and a second speech signal including noise, wherein the first speech signal is acquired from a near-end audio acquisition device close to a sound source, and the second speech signal is acquired from a far-end audio acquisition device far from the sound source, and the near-end audio acquisition device is closer to the sound source than the far-end audio acquisition device; acquiring a pseudo-pure speech signal based on the first speech signal and the second speech signal, as a reference speech signal; enhancing the second speech signal by using a preset speech enhancement algorithm, to obtain a denoised speech signal to be tested; and acquiring a correlation coefficient between the reference speech signal and the denoised speech signal to be tested, wherein the correlation coefficient is used for evaluating the speech enhancement algorithm.

According to a second aspect of embodiments of the disclosure, an electronic device, includes: a processor, and a memory storing instructions executable by the processor, wherein the processor is configured to: acquire a first speech signal including noise and a second speech signal including noise, wherein the first speech signal is acquired from a near-end audio acquisition device close to a sound source, and the second speech signal is acquired from a far-end audio acquisition device far from the sound source, and the near-end audio acquisition device is closer to the sound source than the far-end audio acquisition device; acquire a pseudo-pure speech signal based on the first speech signal and the second speech signal, as a reference speech signal; enhance the second speech signal by using a preset speech enhancement algorithm, to obtain a denoised speech signal to be tested; and acquire a correlation coefficient between the reference speech signal and the denoised speech signal to be tested, wherein the correlation coefficient is used for evaluating the speech enhancement algorithm.

According to a third aspect of embodiments of the disclosure, a non-transitory computer-readable storage medium has stored thereon instructions that, when executed by a processor of a device, cause the device to perform a method for evaluating performance of a speech enhancement algorithm. The method includes: acquiring a first speech signal including noise and a second speech signal including noise, wherein the first speech signal is acquired from a near-end audio acquisition device close to a sound source, and the second speech signal is acquired from a far-end audio acquisition device far from the sound source, and the near-end audio acquisition device is closer to the sound source than the far-end audio acquisition device; acquiring a pseudo-pure speech signal based on the first speech signal and the second speech signal, as a reference speech signal; enhancing the second speech signal by using a preset speech enhancement algorithm, to obtain a denoised speech signal to be tested; and acquiring a correlation coefficient between the reference speech signal and the denoised speech signal to be tested, wherein the correlation coefficient is used for evaluating the speech enhancement algorithm.

It should be understood that the general description above and detailed description below are merely exemplary and explanatory, and are not intended to restrict the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
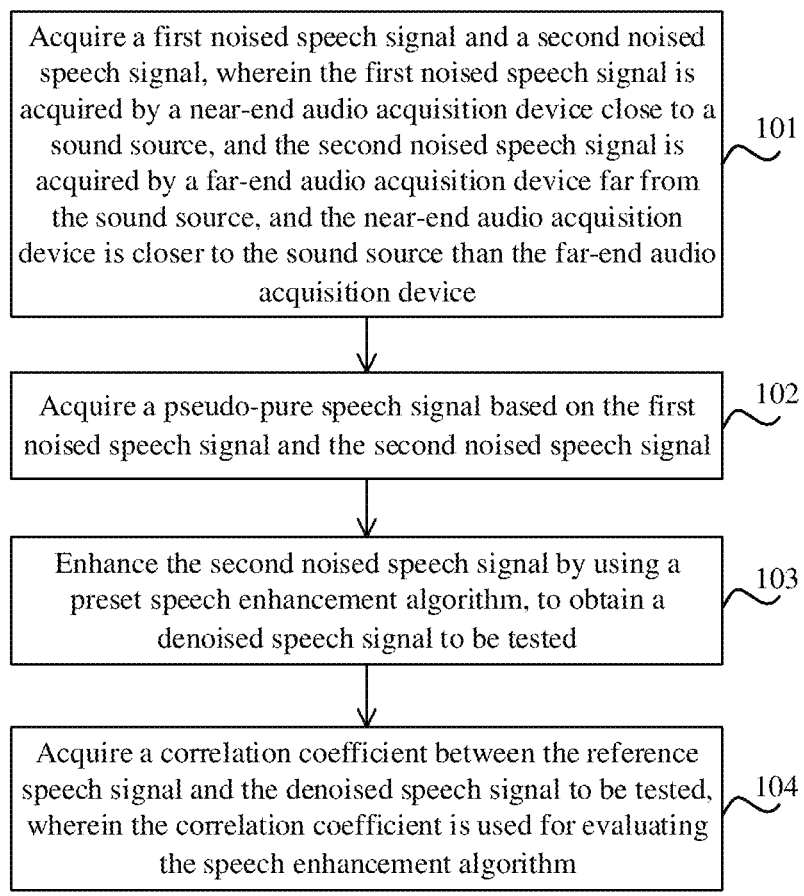
FIG. 1 illustrates a flowchart of a method for evaluating performance of a speech enhancement algorithm according to an exemplary embodiment.

Embodiments of the disclosure provide a method and device for evaluating performance of a speech enhancement algorithm, applicable for an electronic device. FIG. 1 illustrates a flowchart of a method for evaluating performance of a speech enhancement algorithm according to an exemplary embodiment. As illustrated in FIG. 1, the method for evaluating performance of a speech enhancement algorithm includes the following steps.

In step 101, a first noised speech signal and a second noised speech signal are acquired.

In this embodiment, an electronic device may be connected with a near-end audio acquisition device and a far-end audio acquisition device, so as to acquire speech signals that include noise, referred to herein as "noised speech signals," from the near-end and far-end audio acquisition devices. The near-end audio acquisition device is an audio acquisition device closer to a sound source, and the far-end audio acquisition device farther from the sound source. Distances from the near-end audio acquisition device and the far-end audio acquisition device to the sound source may be set according to an application scene. For example, the distance from the near-end audio acquisition device to the sound source is smaller than 30 cm, and the distance from the far-end audio acquisition device to the sound source is greater than 200 cm. It is to be noted that the number of audio acquisition devices may be set according to an application scene.

In this embodiment, when the sound source (e.g., a user or a player device) outputs a speech, the near-end audio acquisition device may acquire the speech to obtain the first noised speech signal. The far-end audio acquisition device may acquire the speech to obtain the second noised speech signal. In this embodiment, the near-end audio acquisition device is closer to the sound source than the far-end audio acquisition device and, therefore, the first noised speech signal has a higher signal to noise ratio and a lower reverberation than those of the second noised speech signal.

In step 102, a pseudo-pure speech signal is estimated based on the first noised speech signal and the second noised speech signal, and the pseudo-pure speech signal is taken as a reference speech signal. In this embodiment, the electronic device may estimate the pseudo-pure speech signal based on the first noised speech signal and the second noised speech signal, and take the pseudo-pure speech signal as a reference speech signal.

Figure 2:
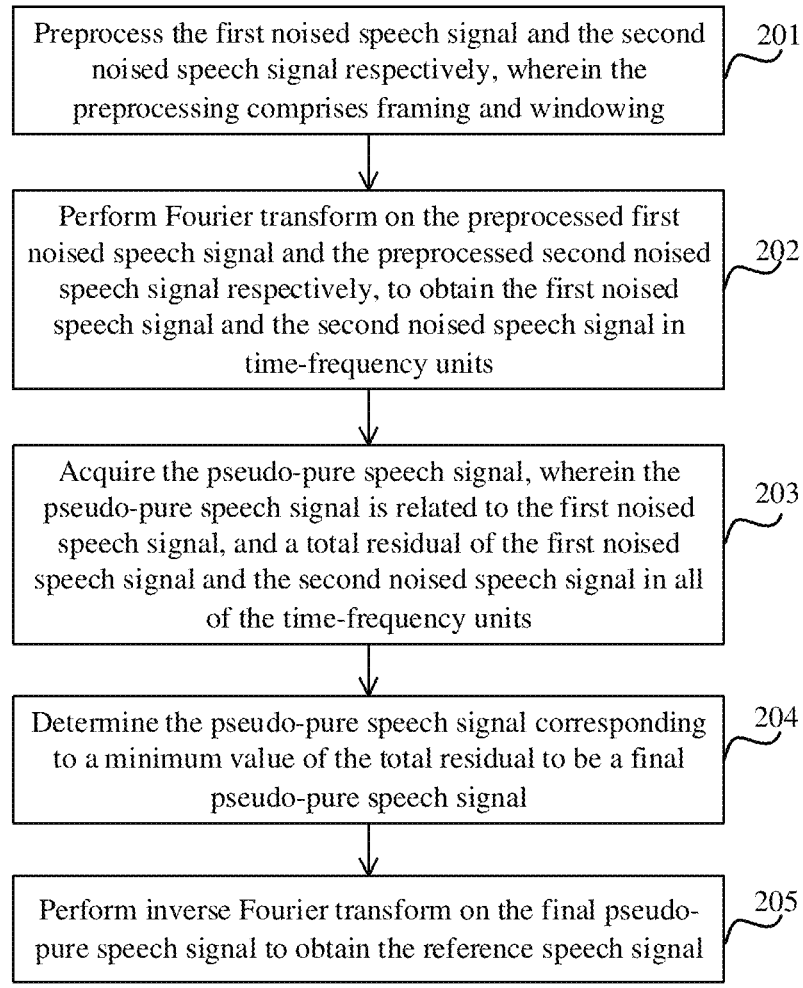
FIG. 2 illustrates a flowchart of acquiring a reference speech signal according to an exemplary embodiment.

FIG. 2 illustrates a flowchart of acquiring a reference speech signal according to an exemplary embodiment. Referring to FIG. 2, in step 201, the electronic device may preprocess the first noised speech signal and the second noised speech signal respectively, and the preprocessing may include framing and windowing. It is to be noted that, in a windowing process, the length of a window, a moving step length of the window, and a type of the window may be selected according to an application scene, which is not limited here. In step 202, the electronic device may perform Fourier transform on the preprocessed first noised speech signal and the preprocessed second noised speech signal respectively, to obtain the first noised speech signal and the second noised speech signal in time-frequency units. It is to be noted that, the Fourier transform may be any one of discrete Fourier transform (DFT), fast Fourier transform (FFT), short-time Fourier transform (STFT), etc., which can be selected according to an application scene and is not limited here. In step 203, the electronic device may acquire the pseudo-pure speech signal. The pseudo-pure speech signal is related to the first noised speech signal, and a total residual of the first noised speech signal and the second noised speech signal in all of the time-frequency units. In step 204, the electronic device may determine the pseudo-pure speech signal corresponding to a minimum value of the total residual to be a final pseudo-pure speech signal. In step 205, an inverse Fourier transform is performed on the final pseudo-pure speech signal to obtain the reference speech signal.

Referring back to FIG. 1, in step 103, the second noised speech signal is enhanced by using a preset speech enhancement algorithm, to obtain a denoised speech signal to be tested.

In this embodiment, the electronic device can enhance the second noised speech signal by using a preset speech enhancement algorithm, to obtain a denoised speech signal to be tested. The speech enhancement algorithm may include but is not limited to one of: fundamental spectral subtraction, Weiner filter noise reduction, least mean square (LMS) adaptive filter based noise reduction, an LMS adaptive notch filter, and deep learning based speech enhancement method. A suitable speech enhancement algorithm may be selected according to an application scene, which is not limited here.

In step 104, a correlation coefficient between the reference speech signal and the denoised speech signal to be tested is acquired. The correlation coefficient is used for evaluating the speech enhancement algorithm.

Figure 3:
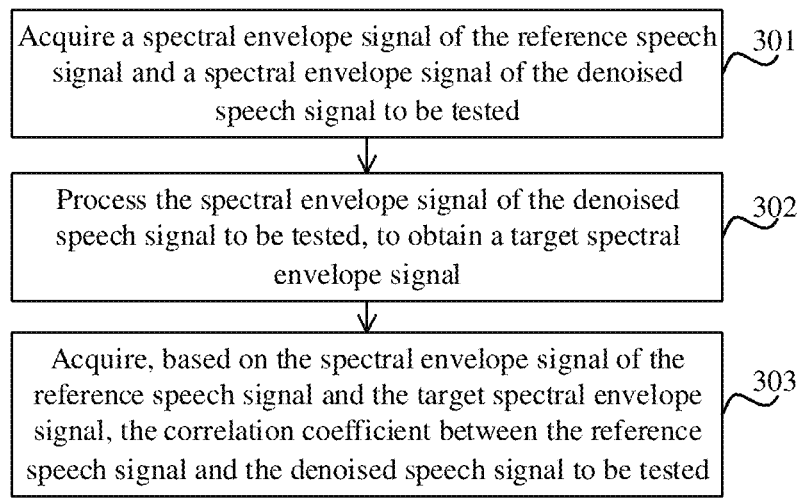
FIG. 3 illustrates a flowchart of acquiring a correlation coefficient according to an exemplary embodiment.

In this embodiment, the electronic device may evaluate the speech enhancement algorithm based on the reference speech signal and the denoised speech signal to be tested. FIG. 3 illustrates a flowchart of acquiring a correlation coefficient according to an exemplary embodiment. Referring to FIG. 3, in step 301, the electronic device may acquire a spectral envelope signal of the reference speech signal and a spectral envelope signal of the denoised speech signal to be tested. In step 302, the electronic device may process the spectral envelope signal of the denoised speech signal to be tested, to obtain a target spectral envelope signal. The processing includes but is not limited to normalization and clipping, and the target spectral envelope signal is a spectral envelope signal having been normalized and clipped. In step 303, the electronic device may acquire, based on the spectral envelope signal of the reference speech signal and the target spectral envelope signal, the correlation coefficient between the reference speech signal and the denoised speech signal to be tested. The correlation coefficient is used for evaluating the performance of the speech enhancement algorithm.

Figure 4:
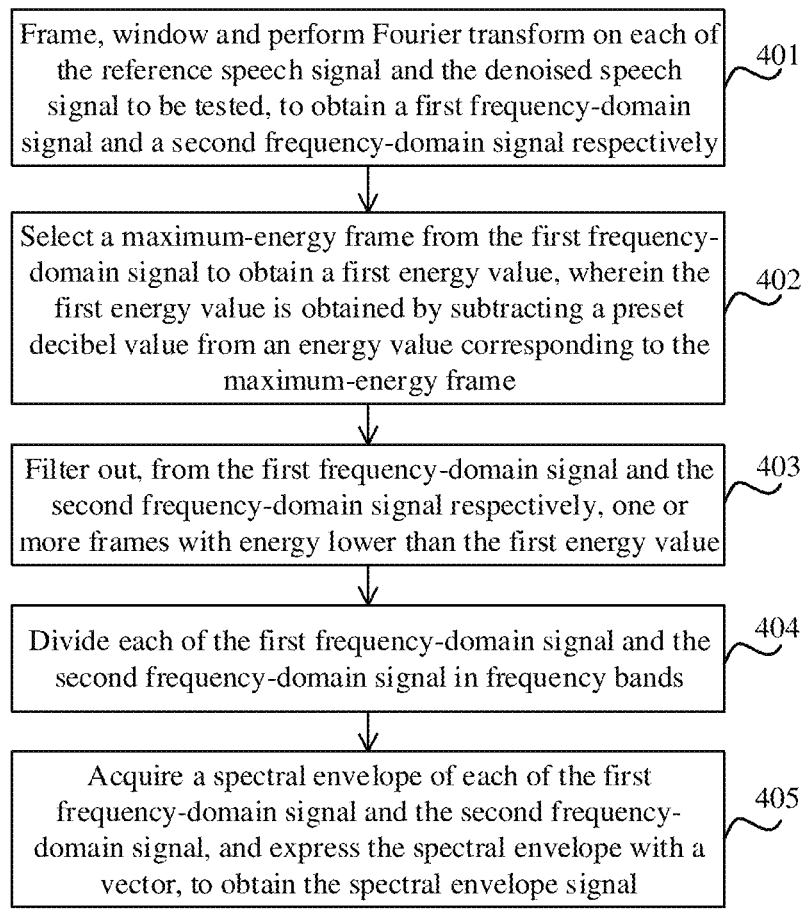
FIG. 4 illustrates a flowchart of acquiring a spectral envelope signal according to an exemplary embodiment.

FIG. 4 illustrates a flowchart of acquiring a spectral envelope signal according to an exemplary embodiment. Referring to FIG. 4, in step 401, the electronic device may frame, window and perform Fourier transform on each of the reference speech signal and the denoised speech signal to be tested, to obtain a first frequency-domain signal and a second frequency-domain signal respectively. In step 402, the electronic device may select a maximum-energy frame from the first frequency-domain signal to obtain a first energy value. The first energy value is obtained by subtracting a preset decibel value (e.g., 40 decibels, which is adjustable) from an energy value corresponding to the maximum-energy frame. In step 403, the electronic device may filter out, from the first frequency-domain signal and the second frequency-domain signal respectively, one or more frames with energy lower than the first energy value. In step 404, the electronic device may divide each of the first frequency-domain signal and the second frequency-domain signal in frequency bands. In step 405, the electronic device may acquire a spectral envelope of each of the first frequency-domain signal and a spectral envelope of the second frequency-domain signal, and express the spectral envelope with a vector, to obtain the spectral envelope signal.

Figure 5:
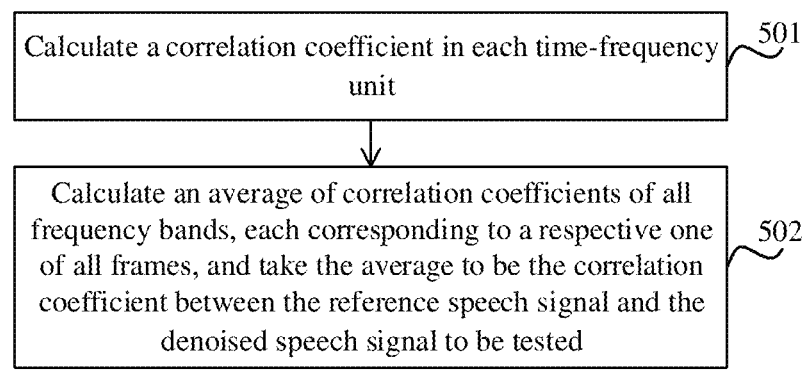
FIG. 5 illustrates a flowchart of acquiring relevancy between an evaluation result and a recognition result according to an exemplary embodiment.

FIG. 5 illustrates a flowchart of acquiring relevancy between an evaluation result and a recognition result according to an exemplary embodiment. Referring to FIG. 5, in step 501, the electronic device may calculate a correlation coefficient in each time-frequency unit. In step 502, the electronic device may calculate an average of correlation coefficients in all frequency bands, each corresponding to a respective one of all frames, and take the average as the correlation coefficient between the reference speech signal and the denoised speech signal to be tested. For example, the correlation coefficient is a fraction, and is within the range of [0, 1]. The value of the correlation coefficient being closer to 1 indicates a better effect of the speech enhancement algorithm in enhancing the speech signal.

In the embodiments of the disclosure, noised speech signals are sampled by a near-end and far-end audio acquisition devices respectively, and a pseudo-pure speech signal of the far-end audio acquisition device is acquired based on first and second noised speech signals. Then the pseudo-pure speech signal is taken as a reference speech signal, so as to evaluate the performance of the speech enhancement algorithm. The pseudo-pure speech signal may be close to a pseudo-pure speech signal with a high signal to noise ratio and a low reverberation in an actual scene. By using the pseudo-pure speech signal as the reference speech signal, a threshold for which a machine can implement recognition successfully can be more approximated, improving the accuracy of the evaluation result. Furthermore, in the embodiments of the disclosure, due to that the pseudo-pure speech signal tends to be closer to a machine recognition scene rather than an auditory prediction scene, the relevancy between the evaluation result and the speech recognition result can be increased.

Figure 6:
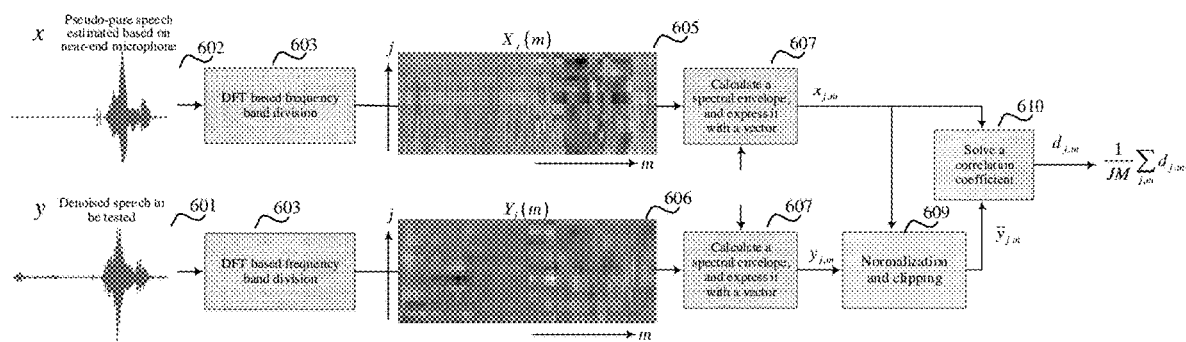
FIG. 6 illustrates a schematic diagram of a method for evaluating performance of a speech enhancement algorithm according to an exemplary embodiment.

FIG. 6 illustrates a schematic diagram of a method for evaluating performance of a speech enhancement algorithm according to an exemplary embodiment. In this embodiment, parameters of recording rooms are shown in Table 1 below. A test dataset includes 1300 pieces of test audio, covering reverberations of 3 rooms, 4 distances, 3 signal-to-noise ratios, and 5 types of noise. T60 (reverberation) is in units of seconds, and the distance, length, width, and height are in units of meters.

TABLE 1

Parameters of recording rooms

| Room | T60 | Distance | Length | Width | Height |
|---|---|---|---|---|---|
| Larger meeting room | 2.819 | 1.5 2 3 4 | 11.99 | 6.315 | 3.053 |
| Smaller meeting room | 2.944 | 1.5 2 3 4 | 5.962 | 5.070 | 3.212 |
| Discussion room | 4.327 | 1.5 2 3 4 | 5.067 | 3.10 | 3.161 |

The electronic device is connected with a near-end microphone and a far-end microphone. The near-end and far-end microphones can record noised speech signals. The electronic device can receive a first noised speech signal from the near-end microphone, and a second noised speech signal from the far-end microphone, and perform speech enhancement processing on the second noised speech signal to obtain a denoised speech signal 601 to be tested.

Next, the electronic device may acquire a pseudo-pure speech signal 602 by minimizing a total residual of the first noised speech signal and the second noised speech signal, and take the pseudo-pure speech signal to be a reference speech signal. This operation may include the following steps.

In a first step, the electronic device may frame, window and perform Fourier transform on the first noised speech signal and the second noised speech signal, to obtain $C(n, f)$ and $X_i(n, f)$, n is an index for frames, f is an index for frequencies, and i is an index for an array of far-end microphones.

In a second step, according to the following formulas, the pseudo-pure speech signal is estimated to be $S_{id}(n, f)$ and a residual $R_{id}(n, f)$ in each time-frequency unit is calculated as follows:

$$S_{id}(n, f) = \sum_{l=Lmin}^{Lmax} G_i(l, f)C(n-l, f);$$

and $$R_{id}(n,f) = X_i(n,f) - S_{id}(n,f),$$

where $L_{min}=-3$, $L_{max}=8$, and $G_i(l, f)$ can be derived by from a minimum total residual according to the following formula:

$$G_i(l, f) = \frac{\sum_n X_i(n, f)C^*(n-l, f)}{\sum_n C(n-l, f)C^*(n-l', f)}.$$

In a third step, inverse Fourier transform is performed on the estimated pseudo-pure speech signal $S_{id}(n, f)$, to transform the estimated pseudo-pure speech signal from a frequency domain to a time domain and obtain the reference speech signal.

Next, mute frames are filtered out from each of the denoised speech signal to be tested and the reference speech signal. Time-frequency transformation and frequency band division are performed, and spectral envelope information is calculated. This operation may include the following steps.

In a first step, framing, windowing and Fourier transform are performed on each of the reference speech signal and the denoised speech signal to be tested, to transform the speech signals from the time domain to the frequency domain.

In a second step, a maximum-energy frame in the reference speech signal is determined, and the frames with energy lower than that of the maximum-energy frame by less than 40 dB are removed from the reference speech signal and the denoised speech signal to be tested. A frequency band of each of the reference speech signal and the denoised speech signal to be tested is divided (603). The frequency band may be divided by according to octaves, MEL frequency bands, Critical bands or the like, which is not limited here.

It is assumed that $\hat{x}(k, m)$ denotes a $k^{th}$ frequency band of an $m^{th}$ frame of the reference speech signal, and the norm of a $j^{th}$ frequency band is referred to as a time-frequency unit, which is defined as below:

$$X_j(m) = \sqrt{\sum_{k=k_1(j)}^{k_2(j)-1} |\hat{x}(k, m)|^2},$$

where $k_1$ and $k_2$ denote end points of an interval of the frequency band (605).

The denoised speech signal to be tested is processed in the same way, to obtain the corresponding $Y_j(m)$ (606).

In a third step, a spectral envelope of each of the reference speech signal and the denoised speech signal to be tested is calculated, and is expressed with a vector (607).

The spectral envelope of the reference speech signal is expressed with the vector as follows:

$$x_{j,m} = [X_j(m-N+1), X_j(m-N+2), \ldots, X_j(m)]^T.$$

In the same way, the spectral envelope $y_{j,m}$ of the denoised speech signal to be tested may also be expressed similarly. In this embodiment, N denotes the total number of frames remained after clipping.

In a fourth step, the denoised speech signal to be tested is normalized and clipped (609). That is, the following calculation is made directly on the spectral envelope signal $y_{j,m}$:

$$y_{j,m}(n) = \min\left(\frac{\|x_{j,m}\|}{\|y_{j,m}\|} y_{j,m}(n), \left(1 + 10^{-\frac{\beta}{20}}\right) x_{j,m}(n)\right),$$

where, $n \in \{1, 2, \ldots, N\}$, $\|\cdot\|$ denotes 2-norm, and $\beta$ is a lower boundary of signal distortion (SDR) and is expressed as follows:

$$SDR = 10\log_{10}\left(\frac{x_{j,m}(n)^2}{(y_{j,m}(n) - x_{j,m}(n))^2}\right) \geq \beta.$$

In a fifth step, a performance parameter of the speech enhancement algorithm is calculated, that is, a correlation coefficient between the denoised speech signal to be tested and the reference speech signal (610).

For example, according to the following formula, the correlation efficient in each time-frequency unit is calculated, that is, a correlation coefficient between $x_{j,m}$ and $y_{j,m}$:

$$d_{j,m} = \frac{(x_{j,m} - \mu_{x_{j,m}})^T (y_{j,m} - \mu_{y_{j,m}})}{\|x_{j,m} - \mu_{x_{j,m}}\| \cdot \|y_{j,m} - \mu_{y_{j,m}}\|},$$

where $\mu_{(\cdot)}$ is a sample average of the corresponding vector.

Then, the average of correlation coefficients corresponding to all frequency bands, each corresponding to a respective one of all frames, is calculated.

$$d = \frac{1}{JM} \sum_{j,m} d_{j,m},$$

where d is the final performance parameter of the speech enhancement algorithm. d is within the range of 0 to 1, and the value of d being closer to 1 indicates better performance of the speech enhancement algorithm.

In this embodiment, the relevancy between the correlation coefficient obtained in step 5 and a probability output by a deep learning based keyword wake-up model Softmax is tested using a Pearson's correlation coefficient. Preliminary tests indicate that an STOI score is very weakly related to the wake-up rate in the related art. In this embodiment, the correlation coefficient and the wake-up rate can be related moderately. The quality of enhanced speech can be accurately evaluated in this embodiment. That is to say, in this embodiment, instead of purely using subjective intelligibility of human ears as a measure, the effect of speech enhancement is evaluated based on the result of the wake-up algorithm. The relevancy between the speech quality score and the speech recognition rate can be improved to a certain extent, so as to obtain a more accurate quality score.

The technical solution provided in the embodiments of the disclosure may have the following beneficial effects. In the embodiments of the disclosure, noised speech signals are sampled by near-end and far-end audio acquisition devices, and a pseudo-pure speech signal of the near-end audio acquisition device is acquired based on first and second noised speech signals. Then the pseudo-pure speech signal is taken to be a reference speech signal, so as to evaluate the performance of the speech enhancement algorithm. The pseudo-pure speech signal may be close to a pseudo-pure speech signal with a high signal-to-noise ratio and a low reverberation in an actual scene. By using the pseudo-pure speech signal as the reference speech signal, a threshold for which a machine can implement recognition successfully can be more approximated, improving the accuracy of the evaluation result. Furthermore, in the embodiments of the disclosure, due to that the pseudo-pure speech signal tends to be closer to a machine recognition scene rather than an auditory prediction scene, the relevancy between the evaluation result and the speech recognition result can be increased, so that the effect of speech enhancement can be evaluated according to a wake-up rate. The evaluation result is more accurate.

Figure 7:
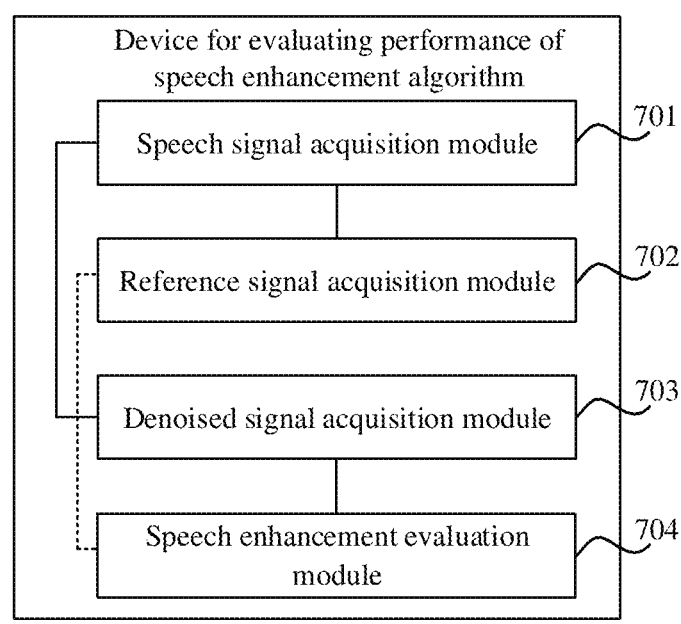
FIG. 7 to FIG. 12 illustrate block diagrams of a device for evaluating performance of a speech enhancement algorithm according to exemplary embodiments.

FIG. 7 illustrates a block diagram of a device for evaluating performance of a speech enhancement algorithm according to an exemplary embodiment. As illustrated in FIG. 7, the device for evaluating performance of a speech enhancement algorithm includes a speech signal acquisition module 701, a reference signal acquisition module 702, a denoised signal acquisition module 703, and a speech enhancement evaluation module 704.

The speech signal acquisition module 701 is configured to acquire a first noised speech signal and a second noised speech signal. The first noised speech signal is acquired from a near-end audio acquisition device close to a sound source, and the second noised speech signal is acquired from a far-end audio acquisition device far from the sound source. The near-end audio acquisition device is closer to the sound source than the far-end audio acquisition device.

The reference signal acquisition module 702 is configured to acquire a pseudo-pure speech signal based on the first noised speech signal and the second noised speech signal and take the pseudo-pure speech signal as a reference speech signal.

The denoised signal acquisition module 703 is configured to enhance the second noised speech signal by using a preset speech enhancement algorithm, to obtain a denoised speech signal to be tested.

The speech enhancement evaluation module 704 is configured to acquire a correlation coefficient between the reference speech signal and the denoised speech signal to be tested. The correlation coefficient is used for evaluating the speech enhancement algorithm.

It is to be noted that, in FIG. 7, the reference signal acquisition module 702 and the speech enhancement evaluation module 704 are connected in a dashed line, so as to distinguish from the connection in a solid line between the speech signal acquisition module 701 and the denoised signal acquisition module 703.

Figure 8:
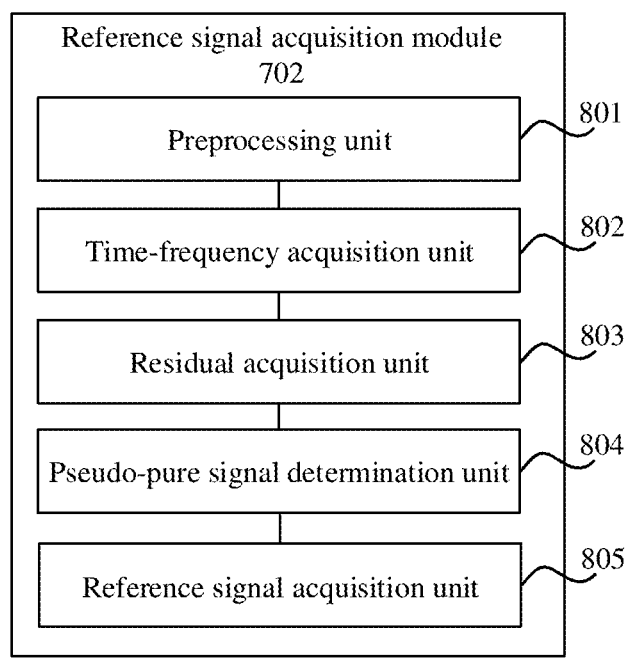

In an embodiment, as illustrated in FIG. 8, the reference signal acquisition module 702 includes: a preprocessing unit 801, a time-frequency acquisition unit 802, a residual acquisition unit 803, a pseudo-pure signal determination unit 804, and a reference signal acquisition unit 805.

The preprocessing unit 801 is configured to preprocess the first noised speech signal and the second noised speech signal respectively. The preprocessing includes framing and windowing.

The time-frequency acquisition unit 802 is configured to perform Fourier transform on the preprocessed first noised speech signal and the preprocessed second noised speech signal respectively, to obtain the first noised speech signal and the second noised speech signal in time-frequency units.

The residual acquisition unit 803 is configured to acquire the pseudo-pure speech signal. The pseudo-pure speech signal is related to the first noised speech signal, and a total residual of the first noised speech signal and the second noised speech signal in all of the time-frequency units.

The pseudo-pure signal determination unit 804 is configured to determine the pseudo-pure speech signal corresponding to a minimum value of the total residual to be a final pseudo-pure speech signal.

The reference signal acquisition unit 805 is configured to perform inverse Fourier transform on the final pseudo-pure speech signal to obtain the reference speech signal.

Figure 9:
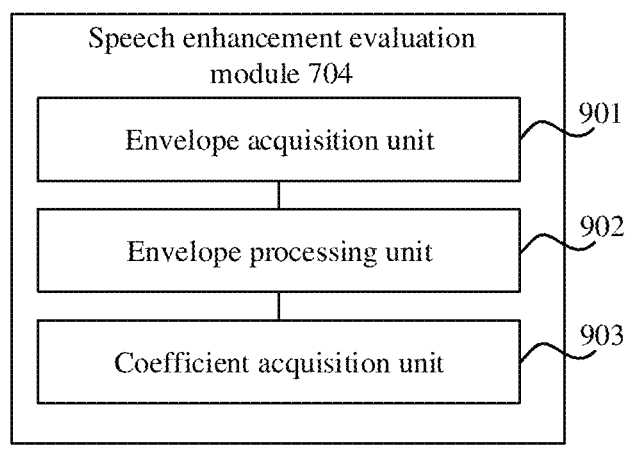

In an embodiment, as illustrated in FIG. 9, the speech enhancement evaluation module 704 includes: an envelope acquisition unit 901, an envelope processing unit 902, and a coefficient acquisition unit 903.

The envelope acquisition unit 901 is configured to acquire a spectral envelope signal of the reference speech signal and a spectral envelope signal of the denoised speech signal to be tested.

The envelope processing unit 902 is configured to process the spectral envelope signal of the denoised speech signal to be tested, to obtain a target spectral envelope signal.

The coefficient acquisition unit 903 is configured to acquire, based on the spectral envelope signal of the reference speech signal and the target spectral envelope signal, the correlation coefficient between the reference speech signal and the denoised speech signal to be tested.

Figure 10:
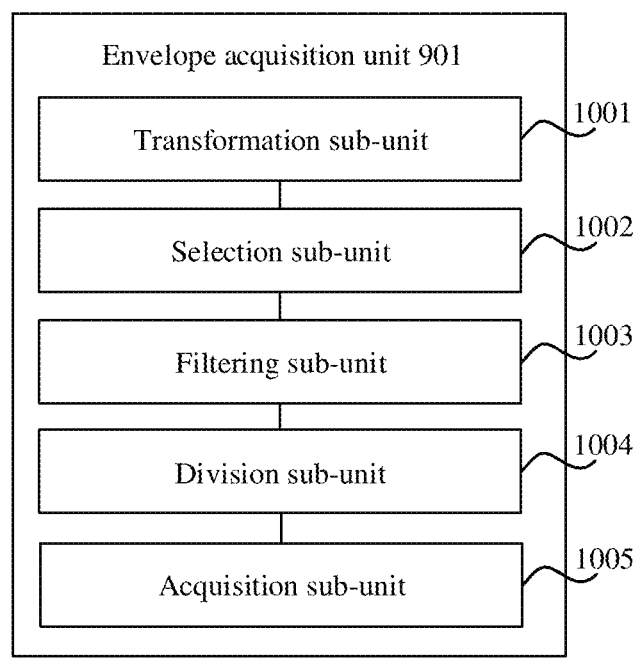

In an embodiment, as illustrated in FIG. 10, the envelope acquisition unit 901 includes: a transformation sub-unit 1001, a selection sub-unit 1002, a filtering sub-unit 1003, a division sub-unit 1004, and an acquisition sub-unit 1005.

The transformation sub-unit 1001 is configured to frame, window and perform Fourier transform on each of the reference speech signal and the denoised speech signal to be tested, to obtain a first frequency-domain signal and a second frequency-domain signal respectively.

The selection sub-unit 1002 is configured to select a maximum-energy frame from the first frequency-domain signal to obtain a first energy value. The first energy value is obtained by subtracting a set decibel value from an energy value corresponding to the maximum-energy frame.

The filtering sub-unit 1003 is configured to filter out, from the first frequency-domain signal and the second frequency-domain signal respectively, one or more frames with energy lower than the first energy value.

The division sub-unit 1004 is configured to divide each of the first frequency-domain signal and the second frequency-domain signal in frequency bands.

The acquisition sub-unit 1005 is configured to acquire a spectral envelope of the first frequency-domain signal and a spectral envelope of the second frequency-domain signal, and express the spectral envelopes with a vector to obtain the spectral envelope signal.

Figure 11:
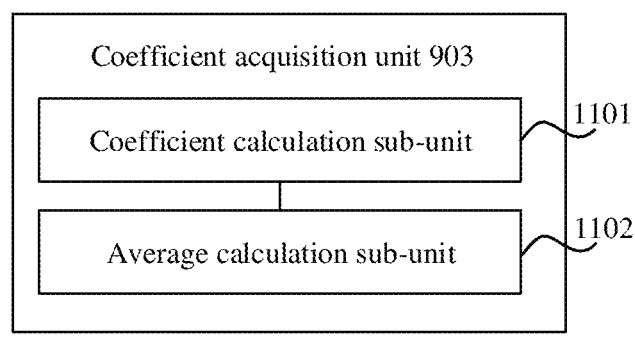

In an embodiment, as illustrated in FIG. 11, the coefficient acquisition unit 903 includes: a coefficient calculation sub-unit 1101 and an average calculation sub-unit 1102.

The coefficient calculation sub-unit 1101 is configured to calculate a correlation coefficient in each time-frequency unit.

The average calculation sub-unit 1102 is configured to calculate an average of correlation coefficients of all frequency bands, each corresponding to a respective one of all frames, and take the average as the correlation coefficient between the reference speech signal and the denoised speech signal to be tested.

Figure 12:
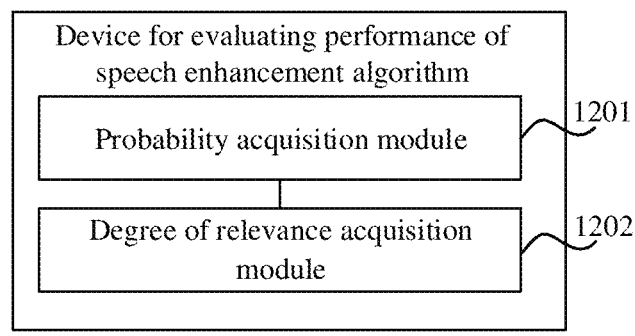

In an embodiment, as illustrated in FIG. 12, the device for evaluating performance of a speech enhancement algorithm further includes: a probability acquisition module 1201 and a degree of relevance acquisition module 1202.

The probability acquisition module 1201 is configured to acquire a probability output by a preset keyword wake-up model.

The degree of relevance acquisition module 1202 is configured to acquire a degree of relevance between the correlation coefficient and the output probability. The degree of relevance indicates relevancy between a speech quality score and a speech recognition rate.

With respect to the device in the embodiments above, the operations of the various modules have been described in detail in the embodiments related to the method.

In the embodiments of the disclosure, noised speech signals are sampled by a near-end and far-end audio acquisition devices, and a pseudo-pure speech signal of the far-end audio acquisition device is estimated based on first and second noised speech signals. Then the pseudo-pure speech signal is taken as a reference speech signal, so as to evaluate the performance of the speech enhancement algorithm. The pseudo-pure speech signal may be close to a pseudo-pure speech signal with a high signal to noise ratio and a low reverberation in an actual scene. As such, in the embodiments of the disclosure, by using the pseudo-pure speech signal as the reference speech signal, a threshold for which a machine implement recognition successfully can be more approximated, improving the accuracy of the evaluation result. Furthermore, in the embodiments of the disclosure, due to that the pseudo-pure speech signal tends to be closer to a machine recognition scene rather than an auditory prediction scene, the relevancy between the evaluation result and the speech recognition result can be increased, so that the effect of speech enhancement can be evaluated according to a wake-up rate. The evaluation result is more accurate.

Figure 13:
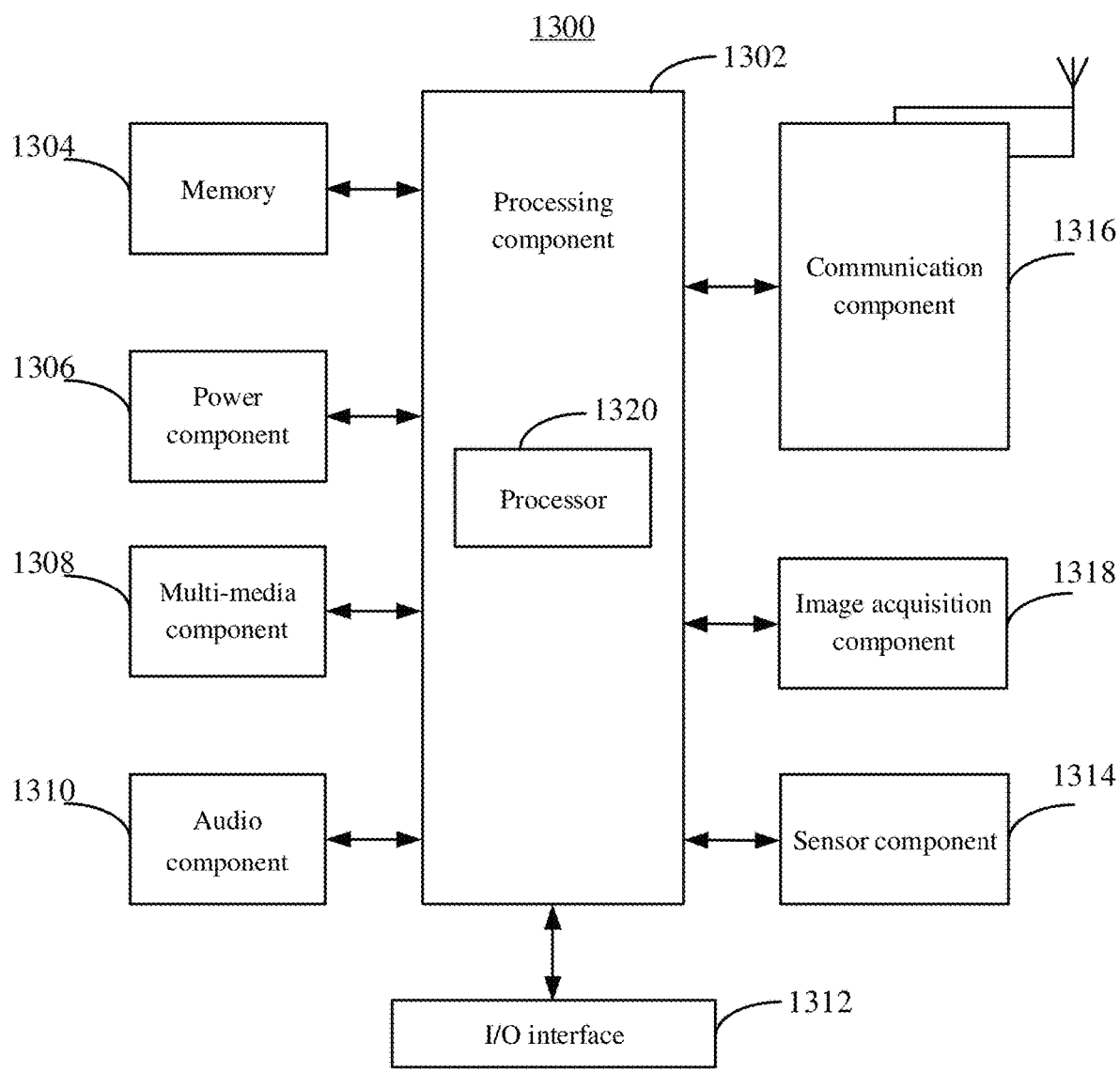
FIG. 13 illustrates a block diagram of an electronic device according to an exemplary embodiment.

FIG. 13 illustrates a block diagram of an electronic device 1300 according to an exemplary embodiment. For example, the device 1300 may be a smart phone, a computer, a digital broadcast terminal, a tablet device, medical equipment, fitness equipment, a personal digital assistant, etc.

As illustrated in FIG. 13, the electronic device 1300 may include one or more of: a processing component 1302, a memory 1304, a power component 1306, a multi-media component 1308, an audio component 1310, an input/output (I/O) interface 1312, a sensor component 1314, a communication component 1316, and an image acquisition component 1318.

The processing component 1302 generally controls the overall operation of the electronic device 1300, such as operations associated with display, a phone call, data communication, a camera operation and a recording operation. The processing component 1302 may include one or more processors 1320 to execute instructions. In addition, the processing component 1302 may include one or more modules for the interaction between the processing component 1302 and the other components. For example, the processing component 1302 may include a multi-media module for interaction between the multi-media component 1308 and the processing component 1302.

The memory 1304 is configured to store various types of data so as to support operations at the electronic device 1300. The examples of these types of data include instructions of any application or method for operating on the electronic device 1300, contact person data, phone book data, messages, pictures, video, etc. The memory 1304 may be implemented by any type of volatile or non-volatile storage device or a combination of both, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1306 supplies power for the various components of the electronic device 1300. The power component 1306 may include a power management system, one or more power sources, and other components associated with the generation, management and distribution of power for the electronic device 1300.

The multi-media component 1308 includes a screen serving as an output interface between the electronic device 1300 and a target object. In some embodiments, the screen may include a liquid crystal display (LCD) screen and a touch pad (TP). If the screen includes a touch panel, the screen may be implemented as a touch screen to receive a signal input by the target object. The touch panel includes one or more touch sensors to sense touches, slides and gestures on the touch panel. The touch sensor may not only sense the boundaries of touch or slide actions, but also can detect the duration and pressure related to the touch or slide operations.

The audio component 1310 is configured to output and/or input an audio signal. For example, the audio component 1310 includes a microphone (MIC), and when the electronic device 1300 is in an operating mode, such as a calling mode, a recording mode and a voice recognition mode, the microphone is configured to receive an external audio signal. The received audio signal can be further stored in the memory 1304 or sent via the communication component 1316. In some embodiments, the audio component 1310 further includes a loudspeaker for output an audio signal.

The I/O interface 1312 provides an interface between the processing component 1302 and a peripheral interface module, and the above peripheral interface module may be a keyboard, a click wheel, a button, etc.

The sensor component 1314 includes one or more sensors for providing state evaluation for the electronic device 1300 from various aspects. For example, the sensor component 1314 may detect an on/off state of the electronic device 1300, and the relative positioning between components; for example the components are a display and keyboard of the electronic device 1300. The sensor component 1314 may also detect a positional change of the electronic device 1300 or a component of the electronic device, whether there is contact between a target object and the electronic device 1300, the orientation or acceleration/deceleration of the electronic device 1300, and a temperature change of the electronic device 1300.

The communication component 1316 is configured for wired or wireless communication between the electronic device 1300 and another device. The electronic device 1300 may access a communication standard-based wireless network, such as WiFi, 4G, 5G or a combination thereof. In an exemplary embodiment, the communication component 1316 receives a broadcast signal from an external broadcast management system or broadcasts relevant information through a broadcast channel. In an exemplary embodiment, the communication component 1316 further includes a near-field communication (NFC) module for short-range communication. In an exemplary embodiment, the communication component 1316 may be implemented based on the radio-frequency identification (RFID) technique, the infra-red data association (IrDA) technique, the ultra-wide band (UWB) technique, the Bluetooth (BT) technique or others.

In an exemplary embodiment, the electronic device 1300 may be implemented by one or more application-specific integrated circuit (ASIC), a digital signal processor (DSP), a digital signal processing device (DSPD), a programmable logic device (PLD), a field-programmable gate array (FPGA), a controller, a microcontroller, a microprocessor or other electronic elements.

In an exemplary embodiment, a non-transitory readable storage medium including instructions is also provided, for example, the memory 1304 including instructions. The instructions may be executed by the processor 1320 of the electronic device 1300 to perform the above described methods. For example, the non-transitory readable storage medium may be a ROM, a random access memory (RAM), a CD-ROM, a magnetic tape, a floppy disk, an optical data storage device and so on.

Other embodiments of the disclosure will be apparent to those skilled in the art from consideration of the specification and practicing of the disclosure here. The disclosure is intended to cover any variations, uses, or adaptations of the present disclosure following the general principles thereof and including such departures from the present disclosure as come within known or customary practice in the art. The embodiments are merely exemplary, and the true scope and spirit of the disclosure are specified by the appended claims.

It should be understood that the disclosure is not limited to the exact construction that has been described above and illustrated in the accompanying drawings, and modifications and changes may be made thereto without departing from the scope thereof. The scope of the disclosure is defined by the appended claims.

What is claimed is:

1. A method for evaluating performance of a speech enhancement algorithm, comprising:
   acquiring a first speech signal including noise and a second speech signal including noise, wherein the first speech signal is acquired from a near-end audio acquisition device close to a sound source, the second speech signal is acquired from a far-end audio acquisition device far from the sound source, and the near-end audio acquisition device is closer to the sound source than the far-end audio acquisition device;
   acquiring a pseudo-pure speech signal based on the first speech signal and the second speech signal, as a reference speech signal;
   enhancing the second speech signal by using a preset speech enhancement algorithm, to obtain a denoised speech signal to be tested; and
   acquiring a correlation coefficient between the reference speech signal and the denoised speech signal to be tested, wherein the correlation coefficient is used for evaluating the speech enhancement algorithm.

2. The method according to claim 1, wherein acquiring the pseudo-pure speech signal based on the first speech signal and the second speech signal, as the reference speech signal comprises:
   preprocessing the first speech signal and the second speech signal respectively, wherein the preprocessing comprises framing and windowing;
   performing Fourier transform on the preprocessed first speech signal and the preprocessed second speech signal respectively, to obtain the first speech signal and the second speech signal in time-frequency units;
   acquiring the pseudo-pure speech signal, wherein the pseudo-pure speech signal is related to the first speech signal, and a total residual of the first speech signal and the second speech signal in all of the time-frequency units;
   determining the pseudo-pure speech signal corresponding to a minimum value of the total residual to be a final pseudo-pure speech signal; and
   performing inverse Fourier transform on the final pseudo-pure speech signal to obtain the reference speech signal.

3. The method according to claim 1, wherein acquiring the correlation coefficient between the reference speech signal and the denoised speech signal to be tested comprises:
   acquiring a spectral envelope signal of the reference speech signal and a spectral envelope signal of the denoised speech signal to be tested;
   processing the spectral envelope signal of the denoised speech signal to be tested, to obtain a target spectral envelope signal; and
   acquiring, based on the spectral envelope signal of the reference speech signal and the target spectral envelope signal, the correlation coefficient between the reference speech signal and the denoised speech signal to be tested.

4. The method according to claim 3, wherein acquiring the spectral envelope signal of the reference speech signal and the spectral envelope signal of the denoised speech signal to be tested comprises:
   framing, windowing and performing Fourier transform on each of the reference speech signal and the denoised speech signal to be tested, to obtain a first frequency-domain signal and a second frequency-domain signal respectively;
   selecting a maximum-energy frame from the first frequency-domain signal to obtain a first energy value, wherein the first energy value is obtained by subtracting a set decibel value from an energy value corresponding to the maximum-energy frame;
   filtering out, from the first frequency-domain signal and the second frequency-domain signal respectively, one or more frames with energy lower than the first energy value;
   dividing each of the first frequency-domain signal and the second frequency-domain signal in frequency bands; and
   acquiring a spectral envelope of each of the first frequency-domain signal and the second frequency-domain signal, and expressing the spectral envelope with a vector to obtain the spectral envelope signal.

5. The method according to claim 3, wherein acquiring, based on the spectral envelope signal of the reference speech signal and the target spectral envelope signal, the correlation coefficient between the reference speech signal and the denoised speech signal to be tested comprises:
   calculating a correlation coefficient in each time-frequency unit; and
   calculating an average of correlation coefficients of all frequency bands, each corresponding to a respective one of all frames, and taking the average as the correlation coefficient between the reference speech signal and the denoised speech signal to be tested.

6. The method according to claim 3, further comprising:
   acquiring a probability output by a preset keyword wake-up model; and
   acquiring a degree of relevance between the correlation coefficient and the output probability, wherein the degree of relevance indicates relevancy between a speech quality score and a speech recognition rate.

7. The method according to claim 1, wherein the correlation coefficient is a fraction, and is within the range of 0 to 1.

8. A device for evaluating performance of a speech enhancement algorithm, comprising:
   a processor; and
   a memory storing instructions executable by the processor, wherein the processor is configured to:
   acquire a first speech signal including noise and a second speech signal including noise, wherein the first speech signal is acquired from a near-end audio acquisition device close to a sound source, the second speech signal is acquired from a far-end audio acquisition device far from the sound source, and the near-end audio acquisition device is closer to the sound source than the far-end audio acquisition device;
   acquire a pseudo-pure speech signal based on the first speech signal and the second speech signal, as a reference speech signal;

enhance the second speech signal by using a preset speech enhancement algorithm, to obtain a denoised speech signal to be tested; and acquire a correlation coefficient between the reference speech signal and the denoised speech signal to be tested, wherein the correlation coefficient is used for evaluating the speech enhancement algorithm.

9. The device according to claim 8, wherein in acquiring the pseudo-pure speech signal based on the first speech signal and the second speech signal, as the reference speech signal, the processor is configured to:

preprocess the first speech signal and the second speech signal respectively, wherein the preprocessing comprises framing and windowing;

perform Fourier transform on the preprocessed first speech signal and the preprocessed second speech signal respectively, to obtain the first speech signal and the second speech signal in time-frequency units;

acquire the pseudo-pure speech signal, wherein the pseudo-pure speech signal is related to the first speech signal, and a total residual of the first speech signal and the second speech signal in all of the time-frequency units;

determine the pseudo-pure speech signal corresponding to a minimum value of the total residual to be a final pseudo-pure speech signal; and perform inverse Fourier transform on the final pseudo-pure speech signal to obtain the reference speech signal.

10. The device according to claim 8, wherein in acquiring the correlation coefficient between the reference speech signal and the denoised speech signal to be tested, the processor is configured to:

acquire a spectral envelope signal of the reference speech signal and a spectral envelope signal of the denoised speech signal to be tested;

process the spectral envelope signal of the denoised speech signal to be tested, to obtain a target spectral envelope signal; and acquire, based on the spectral envelope signal of the reference speech signal and the target spectral envelope signal, the correlation coefficient between the reference speech signal and the denoised speech signal to be tested.

11. The device according to claim 10, wherein in acquiring the spectral envelope signal of the reference speech signal and the spectral envelope signal of the denoised speech signal to be tested, the processor is configured to:

frame, window and perform Fourier transform on each of the reference speech signal and the denoised speech signal to be tested, to obtain a first frequency-domain signal and a second frequency-domain signal respectively;

select a maximum-energy frame from the first frequency-domain signal to obtain a first energy value, wherein the first energy value is obtained by subtracting a set decibel value from an energy value corresponding to the maximum-energy frame;

filter out, from the first frequency-domain signal and the second frequency-domain signal respectively, one or more frames with energy lower than the first energy value;

divide each of the first frequency-domain signal and the second frequency-domain signal in frequency bands; and acquire a spectral envelope of each of the first frequency-domain signal and the second frequency-domain signal, and express the spectral envelope with a vector to obtain the spectral envelope signal.

12. The device according to claim 10, wherein in acquiring, based on the spectral envelope signal of the reference speech signal and the target spectral envelope signal, the correlation coefficient between the reference speech signal and the denoised speech signal to be tested, the processor is configured to:

calculate a correlation coefficient in each time-frequency unit; and calculate an average of correlation coefficients of all frequency bands, each corresponding to a respective one of all frames, and take the average as the correlation coefficient between the reference speech signal and the denoised speech signal to be tested.

13. The device according to claim 10, wherein the processor is further configured to:

acquire a probability output by a preset keyword wake-up model; and acquire a degree of relevance between the correlation coefficient and the output probability, wherein the degree of relevance indicates relevancy between a speech quality score and a speech recognition rate.

14. The device according to claim 8, wherein the correlation coefficient is a fraction, and is within the range of 0 to 1.

15. A non-transitory computer-readable storage medium having stored thereon instructions that, when executed by a processor of a device, cause the device to perform a method for evaluating performance of a speech enhancement algorithm, the method comprising:

acquiring a first speech signal including noise and a second speech signal including noise, wherein the first speech signal is acquired from a near-end audio acquisition device close to a sound source, the second speech signal is acquired from a far-end audio acquisition device far from the sound source, and the near-end audio acquisition device is closer to the sound source than the far-end audio acquisition device;

acquiring a pseudo-pure speech signal based on the first speech signal and the second speech signal, as a reference speech signal;

enhancing the second speech signal by using a preset speech enhancement algorithm, to obtain a denoised speech signal to be tested; and acquiring a correlation coefficient between the reference speech signal and the speech signal to be tested, wherein the correlation coefficient is used for evaluating the speech enhancement algorithm.

16. The non-transitory computer-readable storage medium according to claim 15, wherein acquiring the pseudo-pure speech signal based on the first speech signal and the second speech signal, as the reference speech signal comprises:

preprocessing the first speech signal and the second speech signal respectively, wherein the preprocessing comprises framing and windowing;

performing Fourier transform on the preprocessed first speech signal and the preprocessed second speech signal respectively, to obtain the first speech signal and the second speech signal in time-frequency units;

acquiring the pseudo-pure speech signal, wherein the pseudo-pure speech signal is related to the first speech signal, and a total residual of the first speech signal and the second speech signal in all of the time-frequency units;

determining the pseudo-pure speech signal corresponding to a minimum value of the total residual to be a final pseudo-pure speech signal; and performing inverse Fourier transform on the final pseudo-pure speech signal to obtain the reference speech signal.

17. The non-transitory computer-readable storage medium according to claim 15, wherein acquiring the correlation coefficient between the reference speech signal and the denoised speech signal to be tested comprises:

acquiring a spectral envelope signal of the reference speech signal and a spectral envelope signal of the denoised speech signal to be tested;

processing the spectral envelope signal of the denoised speech signal to be tested, to obtain a target spectral envelope signal; and acquiring, based on the spectral envelope signal of the reference speech signal and the target spectral envelope signal, the correlation coefficient between the reference speech signal and the denoised speech signal to be tested.

18. The non-transitory computer-readable storage medium according to claim 17, wherein acquiring the spectral envelope signal of the reference speech signal and the spectral envelope signal of the denoised speech signal to be tested comprises:

framing, windowing and performing Fourier transform on each of the reference speech signal and the denoised speech signal to be tested, to obtain a first frequency-domain signal and a second frequency-domain signal respectively;

selecting a maximum-energy frame from the first frequency-domain signal to obtain a first energy value, wherein the first energy value is obtained by subtracting a set decibel value from an energy value corresponding to the maximum-energy frame;

filtering out, from the first frequency-domain signal and the second frequency-domain signal respectively, one or more frames with energy lower than the first energy value;

dividing each of the first frequency-domain signal and the second frequency-domain signal in frequency bands; and acquiring a spectral envelope of each of the first frequency-domain signal and the second frequency-domain signal, and expressing the spectral envelope with a vector to obtain the spectral envelope signal.

19. The non-transitory computer-readable storage medium according to claim 17, wherein acquiring, based on the spectral envelope signal of the reference speech signal and the target spectral envelope signal, the correlation coefficient between the reference speech signal and the denoised speech signal to be tested comprises:

calculating a correlation coefficient in each time-frequency unit; and calculating an average of correlation coefficients of all frequency bands, each corresponding to a respective one of all frames, and taking the average to be the correlation coefficient between the reference speech signal and the denoised speech signal to be tested.

20. The non-transitory computer-readable storage medium according to claim 17, wherein the method further comprises:

acquiring a probability output by a preset keyword wake-up model; and acquiring a degree of relevance between the correlation coefficient and the output probability, wherein the degree of relevance indicates relevancy between a speech quality score and a speech recognition rate.

* * * * *